Sept. 20, 1960 A. TANAKA 2,953,190
VEHICLE SEAT ADJUSTER
Filed May 7, 1958 2 Sheets-Sheet 1
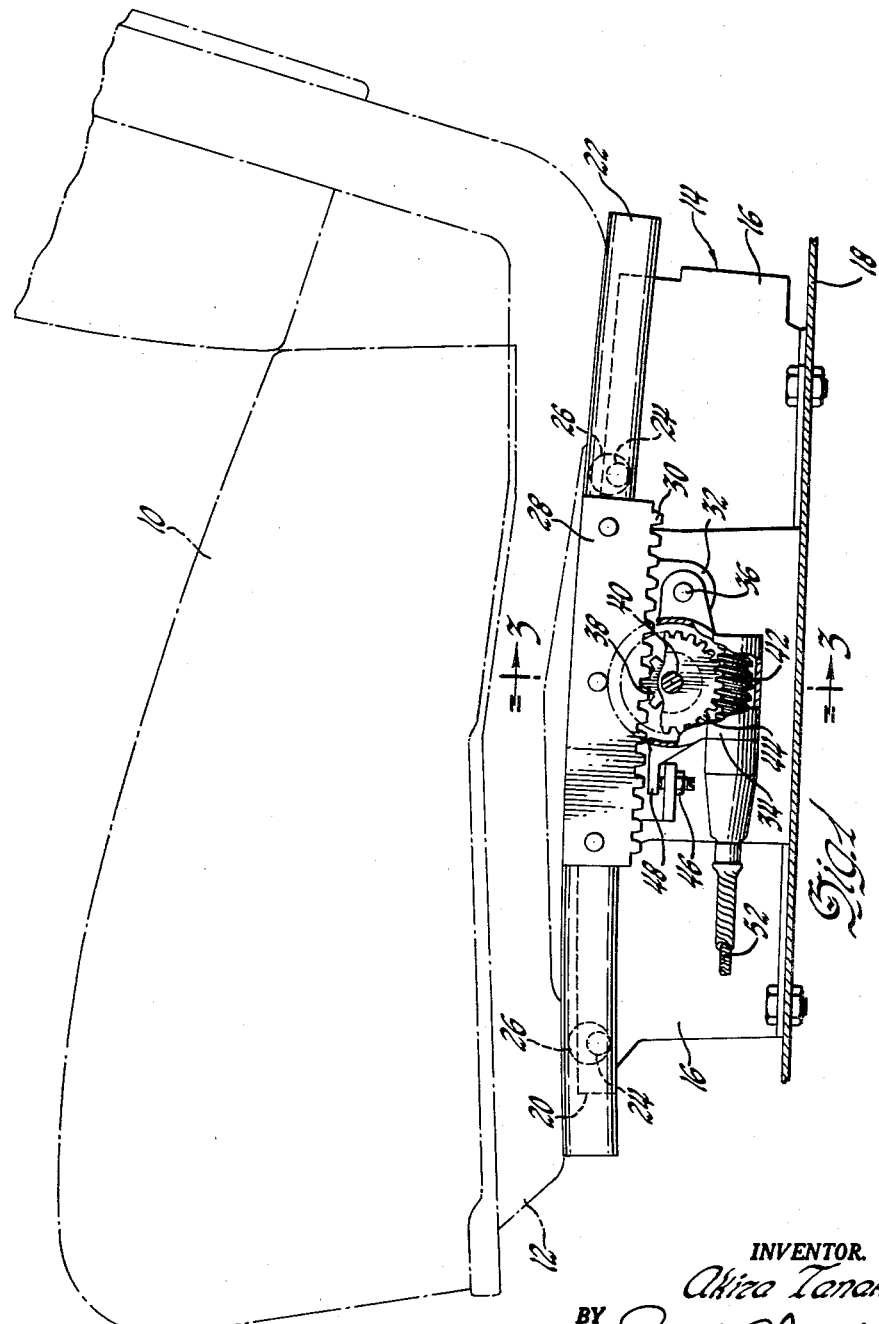
INVENTOR.
Akira Tanaka
BY
ATTORNEY

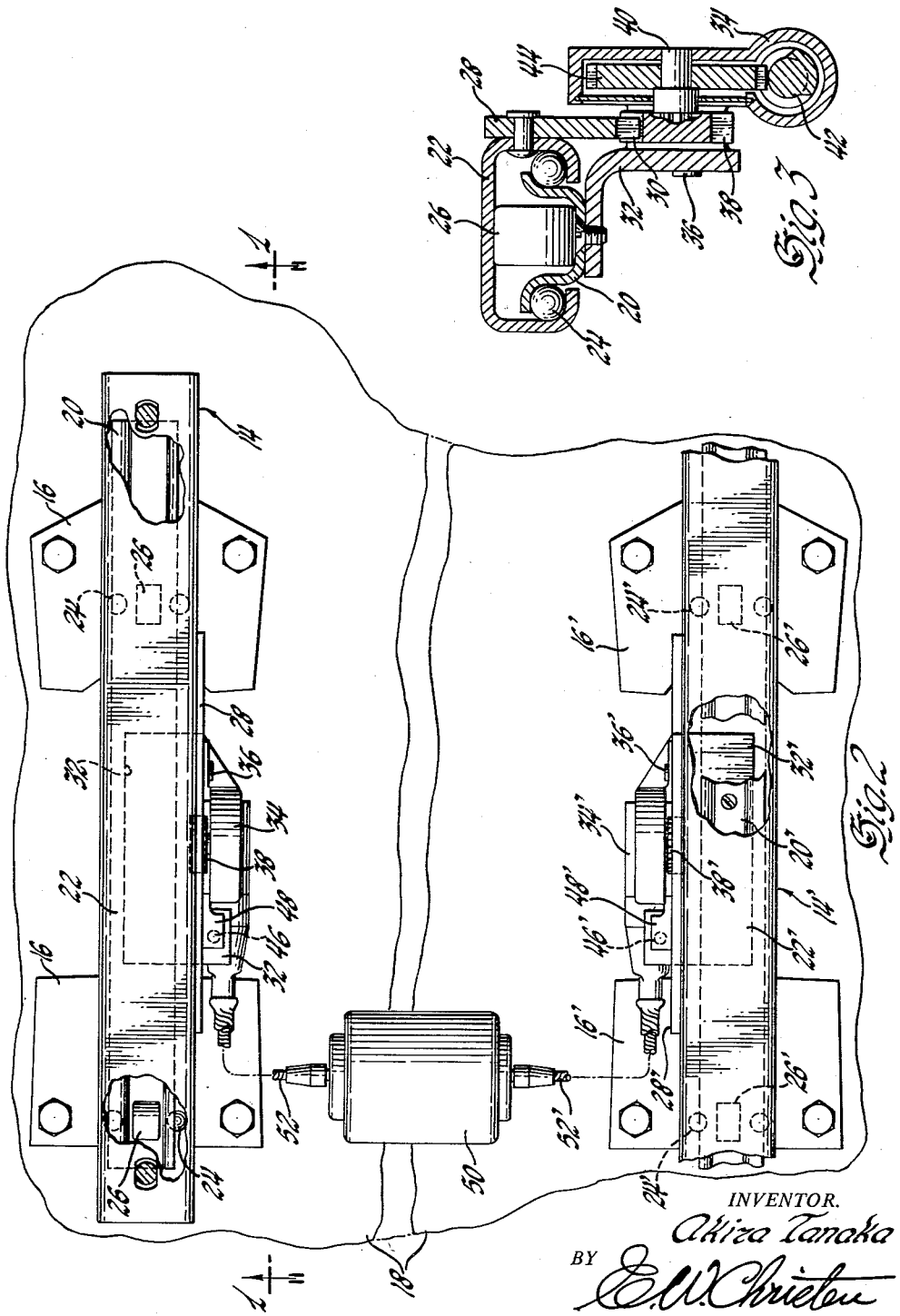

United States Patent Office 2,953,190
Patented Sept. 20, 1960

2,953,190

VEHICLE SEAT ADJUSTER

Akira Tanaka, Detroit, Mich., assignor to General Motors Corporation, Detroit, Mich., a corporation of Delaware Filed May 7, 1958, Ser. No. 733,640

4 Claims. (Cl. 155—14)

This invention relates to seat adjusters for vehicles and more particularly to a power driven seat adjuster.

The front seats of vehicles are slidably mounted on spaced pairs of upper and lower tracks for fore and aft adjustment and in many cases, a motor is provided to accomplish the adjustment. Various seat adjuster arrangements have been used, however, conventional designs are not satisfactory for low silhouette vehicles for as vehicles become lower the drive shaft tunnel that runs between the seat tracks occupies more of the vertical space between the floor and seat bottom thereby leaving little or no room in that area for the seat adjuster mechanism.

An object of the invention is to provide a power driven seat adjuster mechanism which is economical in construction and which is arranged compactly in the seat track area and away from the drive shaft tunnel area.

Other objects of the invention will be apparent from the following description, reference being had to the accompanying drawings wherein a preferred form of the invention is shown.

In the drawings:

Figure 1 is a side elevational view, taken substantially on the plane indicated by the line 1—1 of Figure 2, of the seat adjuster at the right side of the front seat of a vehicle;

Figure 2 is a plan view of the entire seat adjuster mechanism; and

Figure 3 is a sectional view through the right drive unit taken substantially on the plane indicated by the line 3—3 of Figure 1.

Referring now to the drawings the front seat 10 of the vehicle includes a bottom frame 12 that is mounted at its sides to right and left seat adjusters 14 and 14' and only the right seat adjuster 14 will be particularly described as the left seat adjuster 14' is similar.

The seat adjuster 14 includes a pair of lower track supports 16 which are bolted to the vehicle floor 18 and which have a generally C-sectioned lower track 20 secured to their upper edges. The lower track 20 extends longitudinally of the vehicle and has a slight semi-circular curvature in the vertical plane with the rear end of the track being closer to the vehicle floor than the front end so that the seat 10 will have a low reclined attitude in the aft position and a high upright attitude in the forward position. A generally C-sectioned upper track 22 supports the seat frame 12 and embraces the lower track 20 and is slidably secured thereto by a plurality of ball and roller bearings 24 and 26, the bearings 26 providing upward support for the seat and the bearings 24 providing downward and lateral support.

A sector gear rack 28 having gear teeth 30 is secured on the vertical inner side of the upper track 22, and the upper track 22 and the sector gear rack 28 are curved in vertical planes to follow semi-circular arcs having a common axis with the axis of the radius of the lower track 20, the common axis being located well below the tracks.

Intermediate the lower track supports 16, the lower track 20 has an L-sectioned plate 32 depending therefrom and a drive unit 34 is pivoted to the plate 32 at 36 for limited swinging adjustment in a vertical plane. The drive unit 34 includes a pinion 38 rotatably supported on the drive unit by a shaft 40 and meshed with the sector gear rack 28 of the upper track 22. The drive unit 34 also includes a rotatable worm 42 which engages a pinion 44 that is secured to the shaft 40. The lower track plate 32 carries an adjusting screw 46 which engages the drive unit 34 at 48 to provide an initial meshing adjustment between the pinion 38 and sector gear rack 28.

A reversible electric motor 50 is drivingly connected at either end by flexible shafts 52 and 52' to the drive unit worms 34 and 34'. When the motor 50 is energized in either direction the pinions 38 and 38' are rotated at a reduced speed to drive the sector gear racks 28 and 28' in a forward or rearward direction. The motor 50 is secured to the floor 18 in a convenient location away from the drive shaft tunnel area.

By providing a separate drive unit for each seat adjuster co-ordinated movement between the right and left tracks is achieved without the use of bulky conventional linkages interconnecting the tracks and by locating the drive mechanisms on one side of the seat adjuster tracks a minimum height seat adjuster is obtained as well as maximum drive shaft tunnel space between the seat adjusters.

While the embodiment of the invention here described is preferred other embodiments may be made within the scope of the invention.

I claim:

1. A seat adjuster comprising a lower fixed track, an upper track secured to the lower track for sliding movement in fore and aft direction and restrained against movement in other directions, a sector gear rack secured to one side of the upper track, the tracks and sector gear rack having a vertical semicircular curvature from a common axis located well below the tracks, a drive unit carried on one side of the lower track and having a pinion in mesh with the sector gear rack, means for adjusting the position of the drive unit on the lower track to provide mesh adjustment for the rack and pinion, and a reversible motor drivingly connected to the drive unit to move the upper track in fore and aft direction.

2. A seat adjuster comprising spaced assemblies each including a lower fixed track, an upper track secured to the lower track for sliding movement in fore and aft direction and restrained against movement in other directions, a sector gear rack secured to one side of the upper track, the tracks and sector gear rack having a vertical semicircular curvature from a common axis, a drive unit carried on one side of the lower track and having a pinion in mesh with the sector gear rack, means for adjusting the position of the drive unit on the lower track to provide mesh adjustment for the rack and pinion, and a reversible motor drivingly connected to the drive units of both assemblies by flexible shafts to move the upper tracks in fore and aft direction.

3. A seat adjuster comprising spaced track assemblies each including a lower fixed track, an upper track secured to the lower track for sliding movement in fore and aft direction and restrained against movement in other directions, a gear rack secured to the upper track, and a speed reduction drive unit carried by the lower track and having a worm, a gear in mesh with the worm, and a pinion of lesser diameter than and coaxially rotatable with the gear and in mesh with the gear rack; means for adjusting the position of the drive unit on the lower track to provide mesh adjustment for the rack and pinion; and means located between the track assemblies for moving the upper tracks in unison in fore and aft direction comprising a reversible electric motor and a pair of flexible shafts drivingly connected to the motor, each shaft being drivingly connected to the worm of a respective drive unit.

4. A seat adjuster comprising spaced assemblies each including a lower track, an upper track secured to the lower fixed track for sliding movement in fore and aft direction and restrained against movement in other directions, a sector gear rack secured to one side of the upper track, the tracks and sector gear rack having a vertical semicircular curvature from a common axis, a drive unit carried on one side of the lower track and having a pinion in mesh with the sector gear rack, said drive unit being pivotally mounted on said lower fixed track to provide adjustment of said drive unit relative to the said sector gear rack, and a reversible motor drivingly connected to the drive units of both assemblies by flexible shafts to move the upper tracks in fore and aft direction.

References Cited in the file of this patent

UNITED STATES PATENTS

| | | |
|---|---|---|
| 1,693,120 | Rhyner | Nov. 27, 1928 |
| 1,838,303 | Fairchild | Dec. 29, 1931 |
| 2,181,671 | Simpson et al. | Nov. 28, 1939 |
| 2,468,147 | Vonada | Apr. 26, 1949 |
| 2,765,024 | Brundage | Oct. 2, 1956 |
| 2,886,094 | Pickles | May 12, 1959 |

FOREIGN PATENTS

| | | |
|---|---|---|
| 19,836 | Great Britain | A.D. 1909 |
| 433,044 | Great Britain | Aug. 6, 1935 |